Jan. 16, 1934.     H. J. RUCH     1,943,931
WEDGE GRIP FOR TESTING MACHINES
Filed July 3, 1929     2 Sheets-Sheet 1

INVENTOR:
HERMAN J. RUCH,
by Murray C. Boyer
Atty.

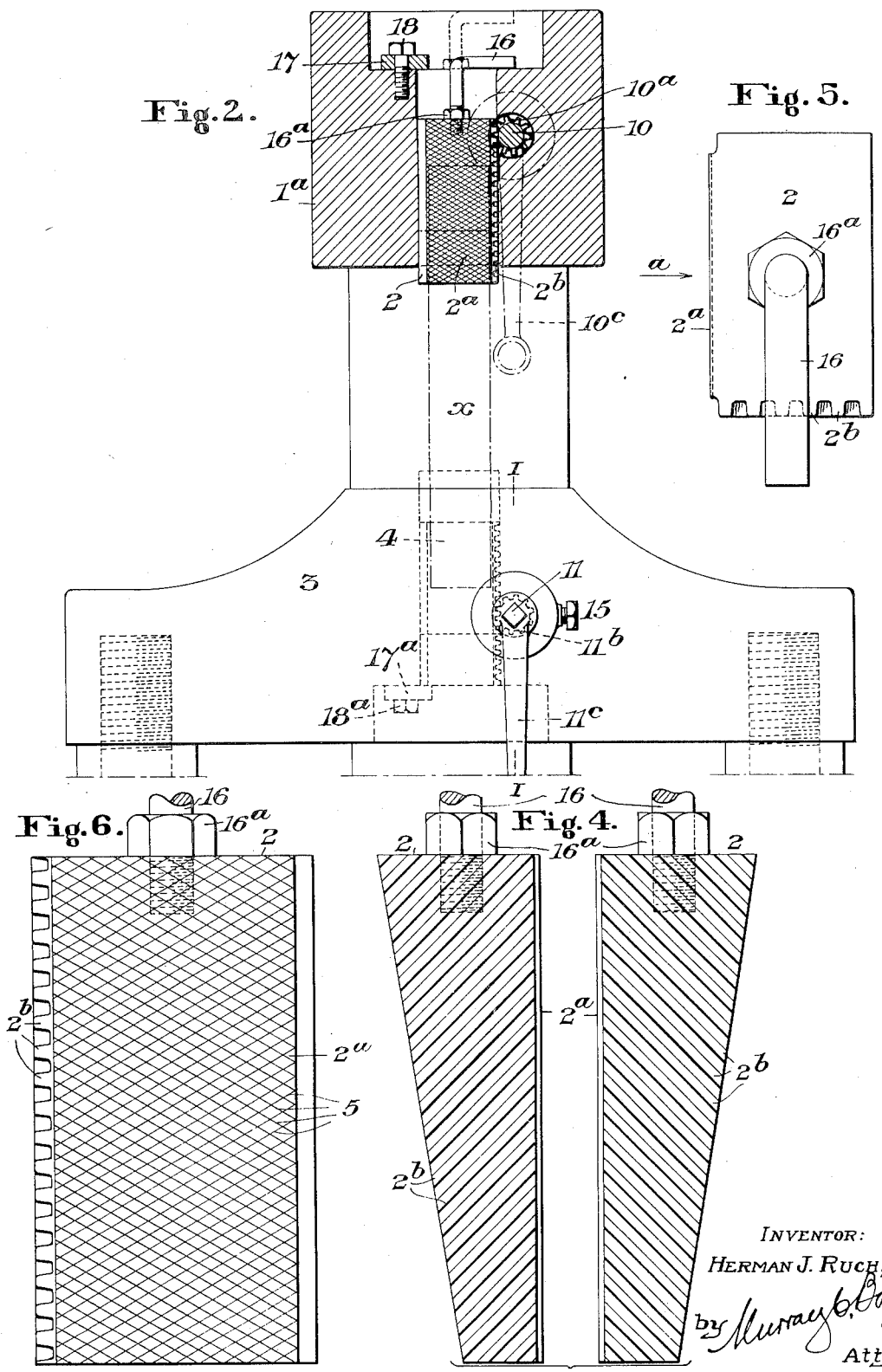

Patented Jan. 16, 1934

1,943,931

UNITED STATES PATENT OFFICE 1,943,931

WEDGE GRIP FOR TESTING MACHINES

Herman J. Ruch, Woodbury Heights, N. J., assignor, by mesne assignments, to Baldwin-Southwark Corporation, a corporation of Delaware Application July 3, 1929. Serial No. 375,638

9 Claims. (Cl. 24—365)

My invention relates to testing machines, and one object of my invention is to provide an improved form of wedge grip and operating means therefor, for holding test pieces during a testing operation.

A further object of my invention is to provide means for positively moving the wedge grips in both directions, i. e., to gripping and releasing positions.

These and other features of my invention are more fully described hereinafter; reference being had to the accompanying drawings, in which:

Fig. 2 is a front elevation of the structure shown in Fig. 1, partly in section on the line II—II thereof.

Fig. 4 is an enlarged view of the pair of upper wedge grips illustrated in Fig. 1.

Fig. 5 is a plan view of the wedge grip shown at the right in Fig. 4, and

Fig. 6 is a side elevation of one of the wedge grips looking in the direction of the arrow $a$, Fig. 5.

Figure 1:
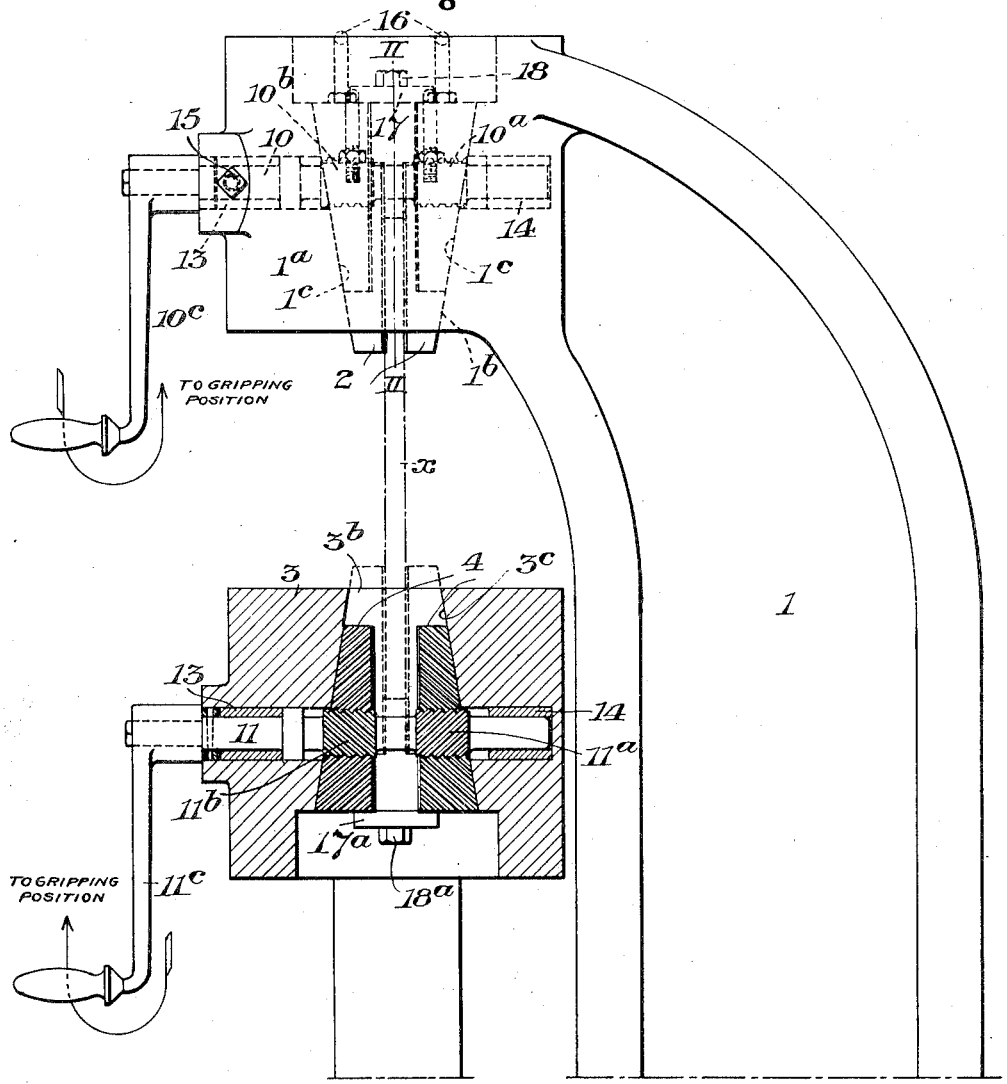
Figure 1 is a view in elevation, partly in section on the line I—I, Fig. 2, of a portion of the head of a testing machine, with the wedge grips positioned therein.
Figure 3:
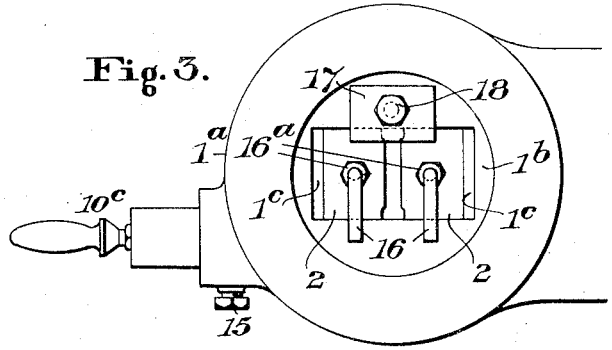
Fig. 3 is a plan view of a portion of the structure shown in Fig. 1.

In the testing of materials, it is essential that the test pieces be held tightly, and that the wedge grips engaging the same shall move in the same relation so that the gripping pressure applied to each end of such test piece shall be uniform. In addition, it is desirable that the motion of the wedge grips from releasing to gripping position, and vice versa shall be in exact parallelism in order that the pressure applied by such wedge grips shall be equally distributed over the entire portion of the test piece engaged, and that when moved to releasing position the wedge grips will be positively separated.

In the drawings, 1 represents part of the head of a testing machine having an overhanging portion $1^a$ which is part of the pulling mechanism of the testing machine. The portion $1^a$ is vertically recessed at $1^b$ for the reception of a pair of wedge grips 2, which serve to grip the upper portion of a test piece, which test piece in the present instance is indicated by broken lines at $x$. Below the overhanging portion $1^a$ and in exact alignment therewith the weighing head 3 is disposed, and such weighing head is vertically recessed at $3^b$ in alignment with the recess of the portion $1^a$, but in the opposite relation, and within such recess $3^b$ the lower wedge grips 4 are mounted.

In Figs. 4, 5 and 6 I have shown the wedge grips of the upper set drawn to a larger scale. The grips are wedge-shape in general contour, with a substantially vertical face indicated at $2^a$ and shown in elevation, Fig. 6, which face is preferably roughened by serrations, file marks, or the like, indicated at 5, and such serrations or other roughening effect may extend in two directions in substantially parallel lines across its face; the lines in one direction being disposed diagonally with respect to those extending in the opposite direction. The lower set of wedge grips are of similar construction. These serrations or other roughening lines are sufficiently deep to insure a proper grip upon the ends of the test piece without unduly marring the surface of the same. Such form of face is employed with flat test pieces. For test pieces having round or other sectional contour, the faces of the wedge grips will be grooved to provide a suitable gripping fit.

One end face of each of the wedge grips shown in Fig. 4 is provided with inclined teeth $2^b$, adapted to mesh with helical gears hereinafter described, which gears are arranged in proper position relatively thereto in order that movement of the same with their gripping faces in exact parallelism may be effected.

For the purpose of moving these wedge grips vertically to gripping and releasing positions, the respective portions of the machine receiving said wedge grips are bored horizontally for the reception of shafts 10 and 11, respectively, each of which shafts carries a pair of helical gears; $10^a$ and $10^b$, and $11^a$ and $11^b$. The gears $10^a$ and $11^a$ mesh with the right hand upper and lower wedge grips, respectively, while the gears $10^b$ and $11^b$ mesh with the left hand upper and lower wedge grips, respectively. These shafts turn in bushings 13 and 14 disposed in the respective horizontal bores, and said shafts are adjustable longitudinally of said bores in order that the engagement of the helical gears with the diagonally arranged teeth of the respective wedge grips may be exactly coordinated so that each pair of said wedge grips may move up and down in exact parallelism, and are automatically spread or contracted positively during such vertical movements.

The rear faces of the wedge grips are inclined and slide on the inclined walls $1^c$ and $3^c$ of the respective recesses $1^b$ and $3^b$ receiving the same, and by reason of the exact relation of the operating gears engaging the teeth of these wedge grips, the movement of each pair of wedge grips toward each other is in exactly the same relation so that a test piece disposed between said wedge grips is clamped at each end in such manner as to maintain its exact vertical position centrally of the strain line of the testing machine; insuring that the testing strain shall be in an exactly vertical direction.

While these wedge grips are constructed in a substantially similar manner, rights and lefts being provided; it will be noted that the teeth of each pair of wedge grips are arranged in the same relation so that when moved to gripping position they will be drawn together and when moved in the opposite direction they will be positively separated and hug the inclined walls 1ᶜ and 3ᶜ of the respective recesses.

The shafts 10 and 11 are provided with handles 10ᶜ and 11ᶜ, in order that movement may be imparted to the same in both directions; clock-wise movement of the upper handle raising and releasing the upper wedge grips, while counter clock-wise movement lowers said grips into active position. Movement of the lower handle in the opposite directions, respectively, effects movement of the lower wedge grips in the opposite directions.

The bushings indicated at 13 in which the shafts 10 and 11 are mounted, may be maintained in their adjusted positions by means of set screws such as indicated at 15.

To prevent the upper wedge grips dropping away from their recess, I preferably provide them with hook members 16 which may rest upon a shouldered portion of the recess 1ᵇ; the upper ends of said wedge grips being tapped for the reception of the same, and these hooks may be held in position by suitable nuts 16ᵃ. In order to prevent the upper wedge grips flying out of their recess 1ᵇ upon fracture of a test piece, I provide a stop member in the form of a plate 17 overlying both of the upper wedge grips. A similar piece 17ᵃ is carried within the recess 3ᵇ of the weighing head below the lower wedge blocks to prevent them dropping out of the same. These stop members may be secured to the shouldered portions of these recesses by bolts 18 and 18ᵃ.

While I have described my improved wedge grips as being utilized in a machine for effecting vertical movement in a testing operation, it will be understood that similar wedge grips with operating means of the character described may be employed in a horizontal or angular position, without departing from my invention.

I claim:

1. A pair of wedge grips for clamping test pieces; said wedge grips having oppositely disposed parallel surfaces and diagonally disposed teeth arranged in opposite relation at edges at right angles to said parallel faces, a pair of helical gears mounted for rotation on a common axis and disposed in engagement with the teeth of said wedge grips, a shaft to which said helical gears are fixed; said shaft being adjustable longitudinally whereby the relation of said helical gears with respect to the teeth of the wedge grips may be regulated to insure uniform movement of the latter, and means for rotating the shaft carrying said helical gears.

2. A pair of wedge grips for clamping test pieces; each of said wedge grips having at one edge thereof diagonally disposed teeth arranged in opposite relation to the teeth on the other grip, a support having a recess in which said wedge grips are arranged for movement, helical gears mounted for rotation on a comon axis and disposed in engagement with the teeth of said wedge grips, a shaft carrying said helical gears; said shaft being longitudinally adjustable whereby the position of said helical gears with respect to the teeth of the respective wedge grips may be regulated to insure uniform movement of the latter, means for holding said shaft in its adjusted position, and means for rotating the shaft carrying said helical gears.

3. A pair of wedge grips for clamping test pieces, a fixed support in which said wedge grips are mounted for movement, means for imparting movement to said wedge grips relatively to the support in which they are mounted, and means carried by the wedge grips for suspending them in their support when not in gripping position.

4. A pair of wedge grips for clamping test pieces, a fixed support in which said wedge grips are mounted for movement, means for imparting movement to said wedge grips relatively to the support in which they are mounted, and hooks carried by the wedge grips for suspending them in said support when not in gripping position.

5. A pair of wedge grips for clamping test pieces, a fixed support in which said wedge grips are mounted for movement, means for imparting movement to said wedge grips relatively to the support in which they are mounted, means carried by the wedge grips for suspending them in their support when not in gripping position, and means independent of the suspension means for limiting the movement of said wedge grips in their support.

6. In a structure such as set forth in claim 3, means for limiting the movement of said wedge grips in their supports.

7. A pair of wedge grips for clamping test pieces, each of said wedge grips having a series of parallel teeth inclining outwardly from a central vertical plane perpendicular to the plane of the toothed edges of the grips, a support having a recess in which said wedge grips are mounted for movement, a pair of helical gears mounted for rotation and disposed in engagement with the teeth of the respective wedge grips, and means for actuating said helical gears whereby longitudinal movement may be imparted to said wedge grips lengthwise of the same; the inclination of the engaging teeth causing said wedge grips to be maintained automatically in contact with the recess of said support during such movement.

8. A plurality of pairs of wedge grips adapted to be centered about a common vertical line, means for positively moving the members of each pair of grips toward said line and vertically about said line whereby an article may be gripped between said members, said means positively holding each of said gripping members in contact with said article in predetermined relationship thereto, to each other and to said vertical line.

9. In combination, a plurality of gripping members having faces inclined at a common angle with respect to their gripping faces, means for supporting said gripping members; said means having a plurality of faces of predetermined and equal angularity with respect to a vertical line and in any plane normal to said line being equally spaced therefrom, and means for adjusting said gripping members to position their vertical faces equidistantly from said vertical line and against the angular face of said supporting member; said gripping members being maintained in said adjusted position while being moved toward said vertical line and along the face of the supporting member.

HERMAN J. RUCH.